United States Patent
Ash et al.

(10) Patent No.: US 10,120,716 B2
(45) Date of Patent: Nov. 6, 2018

(54) TASK POOLING AND WORK AFFINITY IN DATA PROCESSING

(71) Applicant: INTERNATIONAL BUSINESS MACHINES CORPORATION, Armonk, NY (US)

(72) Inventors: Kevin J. Ash, Tucson, AZ (US); Seamus J. Burke, Tucson, AZ (US); Lokesh M. Gupta, Tucson, AZ (US); Clint A. Hardy, Tucson, AZ (US); Matthew J. Kalos, Tucson, AZ (US); Trung N. Nguyen, Tucson, AZ (US); Karl A. Nielsen, Tucson, AZ (US); Louis A. Rasor, Tucson, AZ (US); David B. Whitworth, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 14/505,311

(22) Filed: Oct. 2, 2014

(65) Prior Publication Data
US 2016/0098296 A1 Apr. 7, 2016

(51) Int. Cl.
G06F 9/44 (2018.01)
G06F 9/45 (2006.01)
G06F 9/50 (2006.01)

(52) U.S. Cl.
CPC .......... *G06F 9/5005* (2013.01); *G06F 9/5027* (2013.01); *G06F 9/5061* (2013.01); *G06F 2209/5012* (2013.01)

(58) Field of Classification Search
CPC .... G06F 9/5005; G06F 9/5027–9/5055; G06F 9/50–9/5038; G06F 9/5061; G06F 9/5011
See application file for complete search history.

(56) References Cited

U.S. PATENT DOCUMENTS 5,349,656 A * 9/1994 Kaneko ................. G06F 9/4881
718/102
6,006,029 A * 12/1999 Bianchi ................. G06F 13/105
703/21

(Continued)

OTHER PUBLICATIONS

Wen-Yen Tsai, A Lock-Controlled Session Table Partitioning Scheme with Dynamic Resource Balancing for Multi-Core Architecture, Institute of Communications Engineering, Department of Computer Science National Tsing Hua University, Taiwan, publication in the IEEE ICC 2011, pp. 1-5.*

(Continued)

*Primary Examiner* — Mongbao Nguyen
(74) *Attorney, Agent, or Firm* — Griffiths & Seaton PLLC (57) ABSTRACT

Mechanisms for improving computing system performance by a processor device. System resources are organized into a plurality of groups. Each of the plurality of groups is assigned one of a plurality of predetermined task pools. Each of the predetermined task pools has a plurality of tasks. Each of the plurality of groups corresponds to at least one physical boundary of the system resources such that a speed of an execution of those of the plurality of tasks for a particular one of the plurality of predetermined task pools is optimized by a placement of an association with the at least one physical boundary and the plurality of groups.

6 Claims, 4 Drawing Sheets

(56) References Cited

U.S. PATENT DOCUMENTS

| | | | | |
|---|---|---|---|---|
| 6,269,390 B1* | 7/2001 | Boland | G06F 9/4881 | 711/120 |
| 6,658,448 B1 | 12/2003 | Stefaniak et al. | | |
| 6,684,313 B2 | 1/2004 | Voigt et al. | | |
| 6,912,712 B1* | 6/2005 | Myung | G06F 9/463 | 718/100 |
| 7,093,258 B1* | 8/2006 | Miller | G06F 9/485 | 718/105 |
| 7,191,207 B2* | 3/2007 | Blount | G06F 3/0613 | 370/208 |
| 7,373,640 B1* | 5/2008 | English | G06F 8/456 | 712/203 |
| 7,487,319 B2* | 2/2009 | Benhase | G06F 9/5016 | 707/999.202 |
| 8,209,694 B2* | 6/2012 | Glistvain | G06F 9/4843 | 718/103 |
| 8,209,702 B1* | 6/2012 | Roytman | G06F 9/5027 | 718/106 |
| 2003/0037091 A1* | 2/2003 | Nishimura | G06F 9/4881 | 718/103 |
| 2005/0240928 A1* | 10/2005 | Brown | G06F 9/5011 | 718/100 |
| 2006/0225077 A1* | 10/2006 | Anderson | G06F 9/526 | 718/104 |
| 2007/0226699 A1* | 9/2007 | Kato | G06F 11/3636 | 717/128 |
| 2008/0282252 A1* | 11/2008 | Prasanna | G06F 9/5072 | 718/104 |
| 2009/0019450 A1* | 1/2009 | Mori | G06F 9/5033 | 718/105 |
| 2010/0031269 A1* | 2/2010 | Fontenot | G06F 9/524 | 718/107 |
| 2010/0217930 A1* | 8/2010 | Liguori | G06F 3/0619 | 711/114 |
| 2011/0107340 A1* | 5/2011 | Gupta | G06F 9/4881 | 718/102 |
| 2011/0131580 A1* | 6/2011 | Krishnamurthy | G06F 9/5038 | 718/102 |
| 2012/0272247 A1* | 10/2012 | Scott | G06F 9/4881 | 718/108 |
| 2013/0103977 A1* | 4/2013 | Zimmermann | G06F 11/0751 | 714/4.11 |
| 2013/0179895 A1* | 7/2013 | Calder | G06F 9/5077 | 718/104 |
| 2013/0191596 A1* | 7/2013 | Benhase | G06F 12/0802 | 711/118 |
| 2013/0198752 A1* | 8/2013 | Benhase | G06F 12/0804 | 718/102 |
| 2013/0238817 A1* | 9/2013 | Klein | G06F 13/385 | 710/12 |
| 2014/0082277 A1* | 3/2014 | Ash | G06F 12/0804 | 711/113 |
| 2014/0082283 A1* | 3/2014 | Ash | G06F 12/0802 | 711/118 |
| 2014/0101671 A1* | 4/2014 | Kobayashi | G06F 9/505 | 718/105 |
| 2014/0115262 A1* | 4/2014 | Sugita | G06F 9/5016 | 711/136 |
| 2014/0282589 A1* | 9/2014 | Kuang | G06F 9/5016 | 718/104 |
| 2015/0007187 A1* | 1/2015 | Shows | G06F 9/5088 | 718/104 |

OTHER PUBLICATIONS

Gurudutt Kumar VJ, developerWorks, Considerations in software design for multi-core multiprocessor architectures, published on May 20, 2013, pp. 1-18 <https://www.ibm.com/developerworks/aix/library/au-aix-multicore-multiprocessor>.*

Aleksey Pesterev, Improving Network Connection Locality on Multicore Systems, pp. 1-14, 2012. https://people.csail.mit.edu/nickolai/papers/pesterev-multiaccept.pdf (Year: 2012).*

Xiaoning Ding, BP-Wrapper: A system framework making any replacement algorithm (almost) lock contention free, pp. 369-380, pp. 2009 http://ranger.uta.edu/~sjiang/pubs/papers/ding-09-BP-Wrapper.pdf (Year: 2009).*

Zbynek Falt, Locality Aware Task Scheduling in Parallel Data Stream Processing, pp. 1-12, 2014. https://pdfs.semanticscholar.org/4195/df43e8f09a285ac45997110302f669da9e30.pdf (Year: 2014).*

Jingjing Wang, Parallel Discrete Event Simulation for Multi-core Systems: Analysis and Optimization, pp. 1574-1583, 2014. https://ieeexplore.ieee.org/stamp/stamp.jsp?tp=&arnumber=6574857 (Year: 2014).*

* cited by examiner

TASK POOLING AND WORK AFFINITY IN DATA PROCESSING

BACKGROUND OF THE INVENTION

Field of the Invention

The present invention relates in general computing systems, and more particularly to, systems and methods for increased data management efficiency in computing storage environments.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

Computing subcomponents, such as computer storage controllers in storage environments, have an accompanying efficient task scheduler for tasks required for processing operations, such as in the above case, processing host Input/Output (I/O) operations. However, many tasks in these environments require access to shared system resources, such as shared data structures. As a result, various synchronization mechanisms may be employed, such as synchronization primitives including locks, to access and update the shared system resources. When these synchronization mechanisms are used, performance of the computing subcomponent may be severely restricted as, for example, the shared data structure is withheld from further manipulation in the computing storage environment until a particular lock is released.

In view of the foregoing limitations, a need exists for mechanisms to increase parallelism and limit the effect of various synchronization mechanisms to shared system resources, such as the aforementioned data structure in computing storage environments.

Accordingly, various embodiments for improving computing system performance by a processor device are provided. In one such embodiment, a method for improving computing system performance by a processor device is provided. System resources are organized into a plurality of groups. Each of the plurality of groups is assigned one of a plurality of predetermined task pools. Each of the predetermined task pools has a plurality of tasks. Each of the plurality of groups corresponds to at least one physical boundary of the system resources such that a speed of an execution of those of the plurality of tasks for a particular one of the plurality of predetermined task pools is optimized by a placement of an association with the at least one physical boundary and the plurality of groups.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, computing subcomponents, such as computer storage controllers in storage environments, have an accompanying efficient task scheduler for tasks required for processing operations, such as in the above case, processing host Input/Output (I/O) operations. However, many tasks in these environments require access to shared system resources, such as shared data structures. As a result, various synchronization mechanisms may be employed, such as synchronization primitives including locks, to access and update the shared system resources. When these synchronization mechanisms are used, performance of the computing subcomponent may be severely restricted as, for example, the shared data structure is withheld from further manipulation in the computing storage environment until a particular lock is released.

In view of the foregoing limitations, a need exists for mechanisms to increase parallelism and limit the effect of various synchronization mechanisms to shared system resources, such as the aforementioned data structure in computing storage environments.

The mechanisms of the illustrated embodiments describe, among other aspects, methodologies for work distribution in computing environments, such as computing storage environments, and for limiting the effect of synchronization. These aspects include such functionality as grouping system resources that are potentially shared, such as storage Task Control Blocks (TCBs) into multiple "task pools," where each pool executes tasks on a unique group of processor devices, such as Central Processing Units (CPUs). Shared resources are subdivided into multiple groups, with each group only in use by one or more distinct task pools. Further, affinity of work may be defined such that only a set or subset of processors in a particular task pool may perform a particular subset of work.

As will be further described, the groups of processing units may be selected, in one embodiment, such that hardware boundaries of the processing units coincide with task pools selected for performing particular tasks, so that data processing performance is optimized. In addition, system resources that are shared and/or in heavy use may be organized into multiple groups that are then assigned specific task pools for those specific resources, such as shared, high-use data structures. Task pool tasks may be selected by their ability to be executed independently of other tasks that are organized into a separate task pool.

Organization of processing units, task pools, and system resources as described herein allows for increased parallelism and work distribution that enhances the computing performance in a variety of areas, including in computing data storage management, as will be further described.

Figure 1:
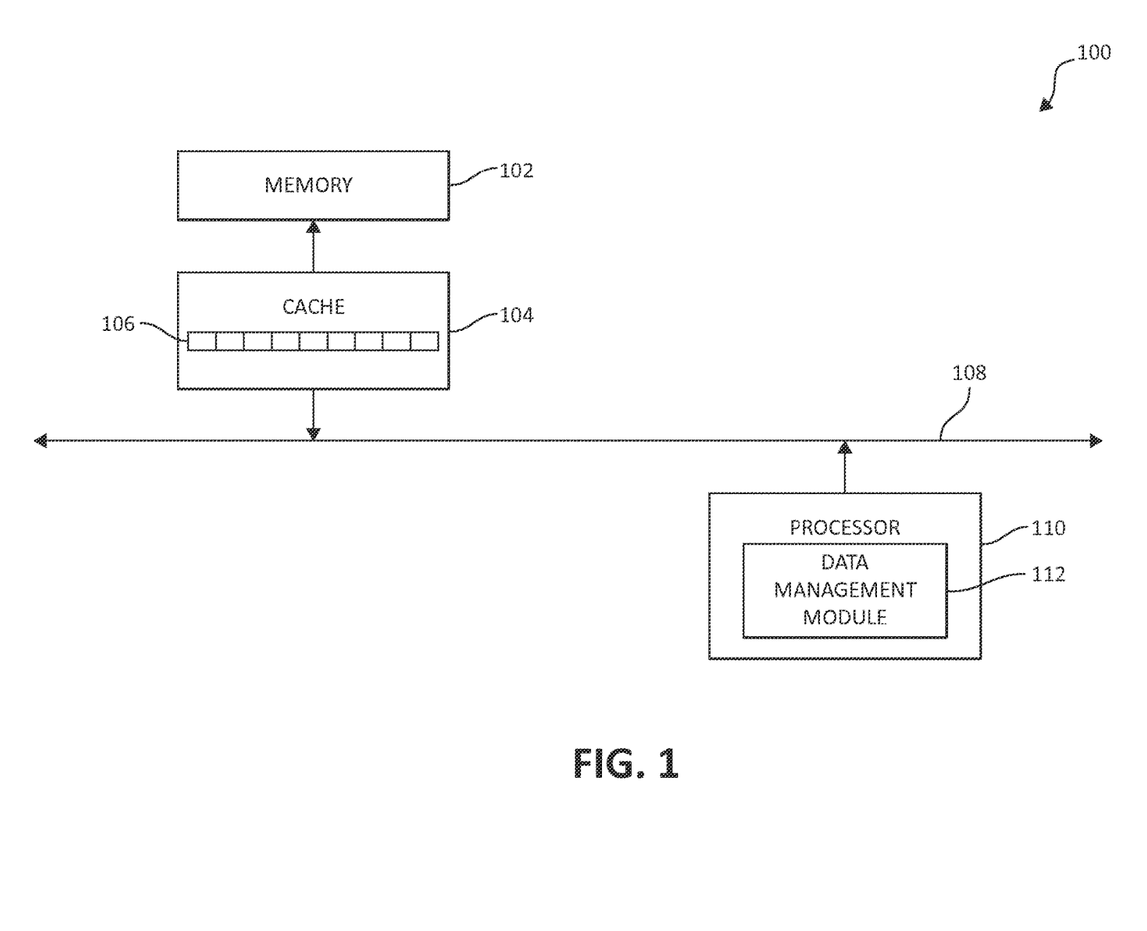
FIG. 1 is an exemplary block diagram showing a hardware structure for processing management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

In various embodiments, processor 110 comprises or has access to a data management module 112, which comprises computer-readable code that, when executed by processor 110, causes processor 110 to perform data management operations in accordance with aspects of the illustrated embodiments. In the various embodiments, processor 110, for example, may organize system resources into groups, where each group is assigned a specific task pool, and where each group corresponds to physical boundar(ies) of the system resources that have performance aspects that are optimized by a placement of an association with the physical boundar(ies) and the group.

In various other embodiments, processor 110 may organize CPU groups by hardware boundaries (or other aspects), that are then tied to execution of at least one specific task pool.

In various other embodiments, processor 110 may identify system resources for use analysis (e.g., whether the system resource is heavily used and/or shared with the environment).

In various other embodiments, processor 110 may organize a number of TCB's into TCB task pools.

In various other embodiments, processor 110, pursuant to previously determining if a shared system resource is heavily used, may organize the high-use system resource into multiple groups that are assigned at least one distinct task pool.

In various other embodiments, processor 110 may organize tasks in the task pools by an ability of those in a particular task pool to independently execute from those in another particular task pool.

Figure 2:
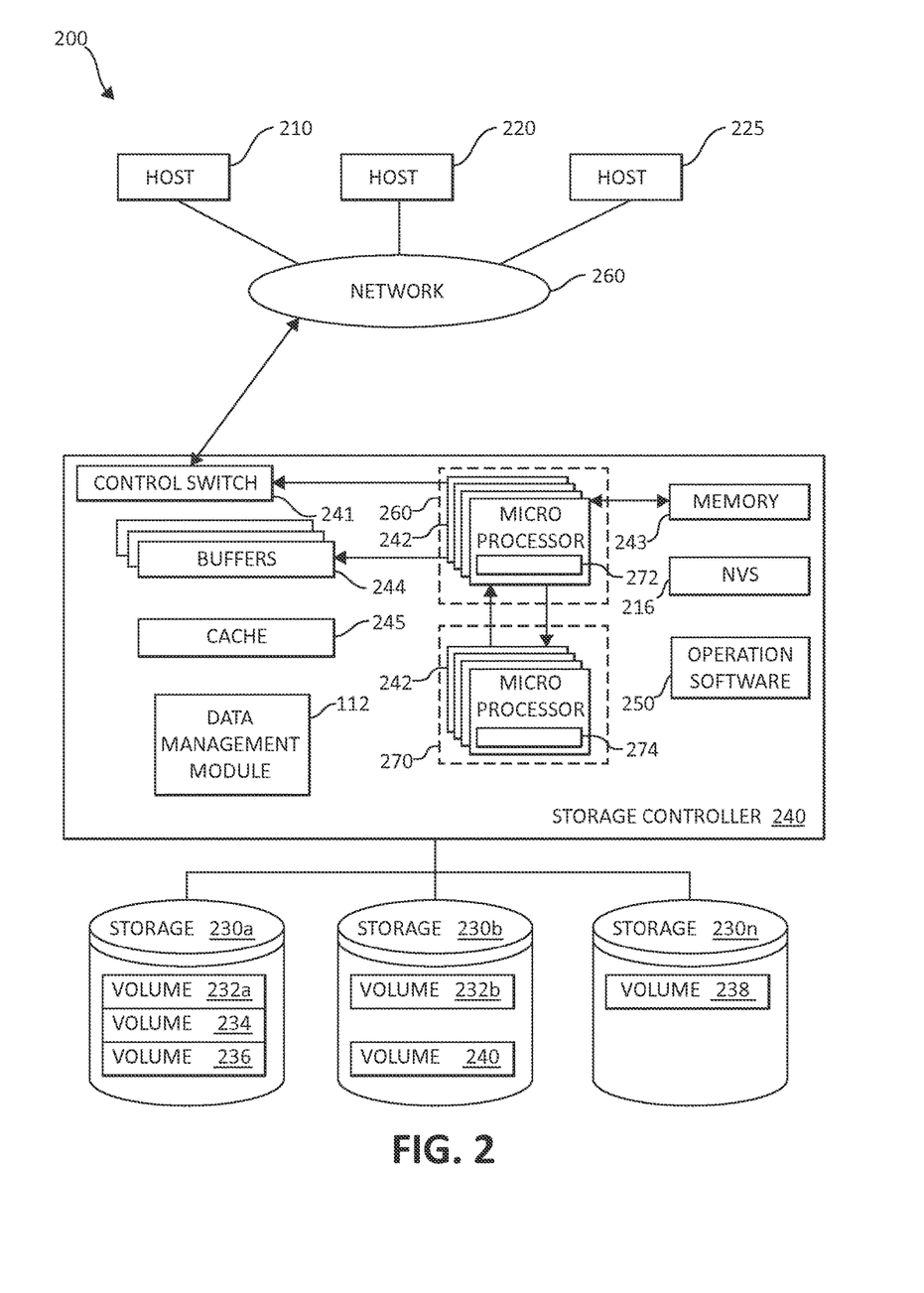
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. As one of ordinary skill in the art will appreciate, however, various computing environments may be adapted to perform aspects of the illustrated embodiments herein. In the instant Figure, Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 including a number of microprocessors 242 that have been organized into groups 260 and 270 as shown. Microprocessor groups 260 and 270 may be organized such that particular microprocessors (e.g., those with specific hardware boundaries) are chosen to be affiliated in a particular group 260 and 270 for cross-affiliation with one or more particular task groups as will be later described in more detail.

It is noted that, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessors 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245. In one embodiment, NVS 216 may be used to store the "first" copy of the data that is used for data update operations as previously described.

The storage controller 240 may include a data management module 112. The data management module 112 may incorporate internal memory (not shown) that may store unprocessed, processed, or "semi-processed" data. The data management module 112 may work in conjunction with each and every component of the storage controller 240, the hosts 210, 220, 225, and other storage controllers 240 and hosts 210, 220, and 225 that may be remotely connected via the storage fabric 260. Data management module 112 may be structurally one complete module or may be associated and/or included with other individual modules. Data management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the data management module 112, in which information may be set. The multiple buffers 244 may be implemented to assist with the methods and steps as described herein.

Data management module 112, in conjunction with one or more microprocessors 242, may perform various aspects of the present invention as will be further described, such as organizing CPU groups by hardware boundaries, or separating shared system resources into multiple groups, as will be further described.

Figure 3:
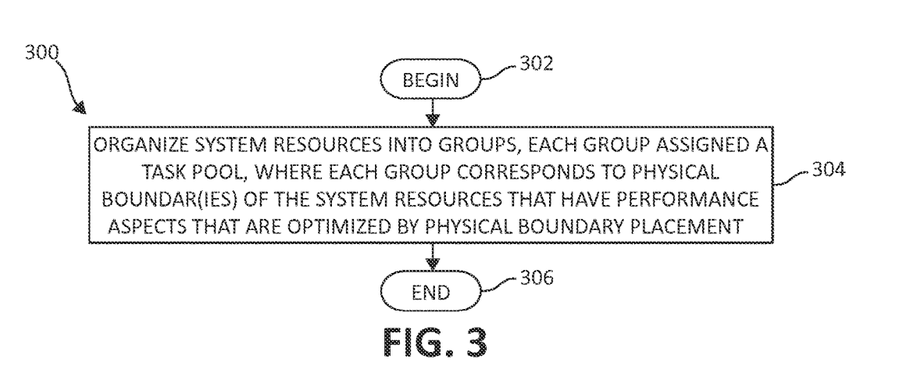
FIG. 3 is a flow chart diagram illustrating an exemplary method for improving work distribution and increasing parallelism in a computing environment, in which aspects of the present invention may be realized.

Turning now to FIG. 3, a flow chart diagram, illustrating a generalized method method 300 for data management in accordance with the present invention, is depicted. Method 300 begins (step 302). System resources are organized into groups, each group assigned at least one particular task pool, where each group corresponds to physical boundar(ies) of the system resources that have performance aspects that are optimized by a placement of an association of the system resource groups and task pool affiliations (step 304). The method 300 then ends (step 306).

Figure 4:
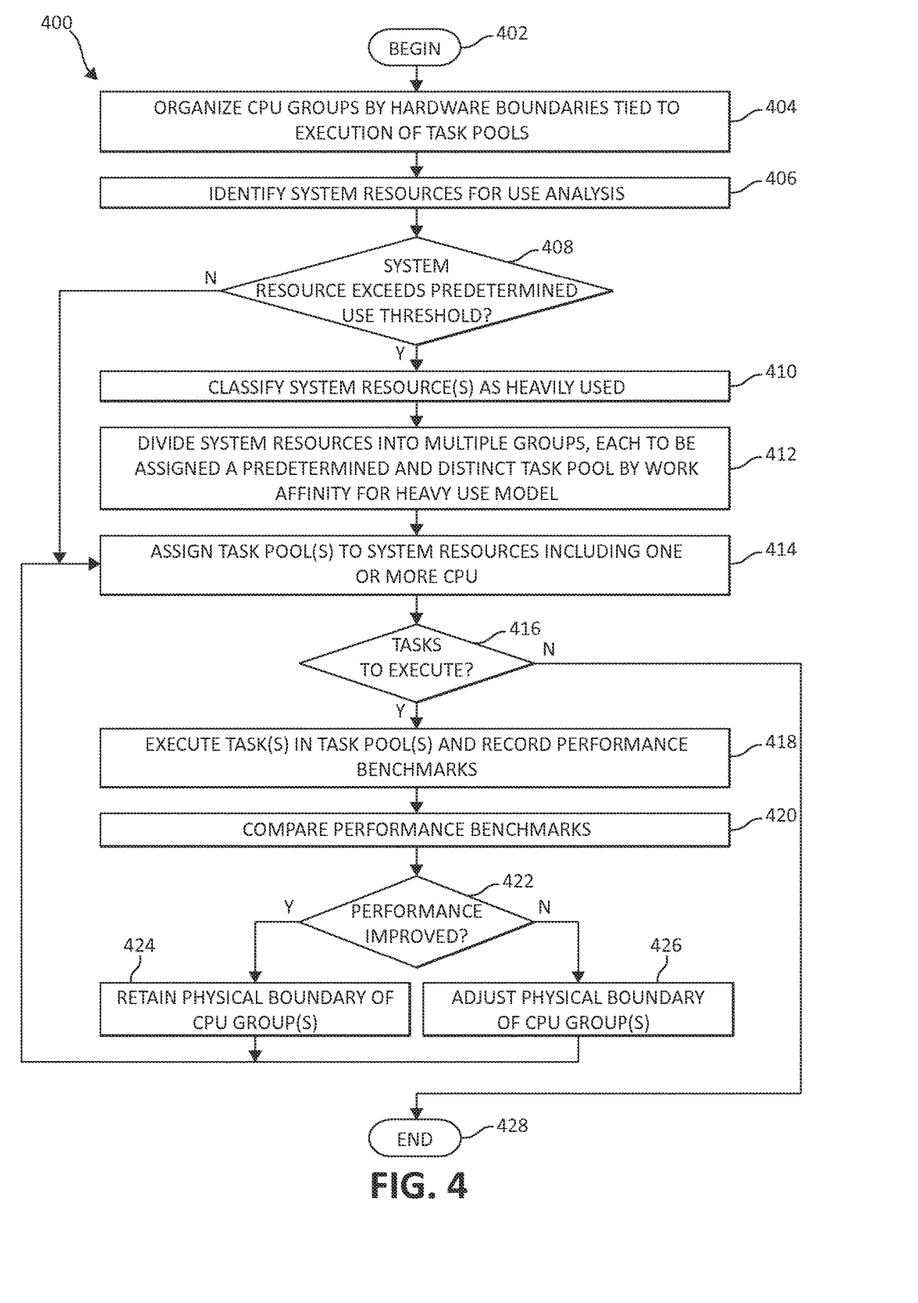
FIG. 4 is an additional flow chart diagram illustrating an additional exemplary method for improving work distribution and increasing parallelism and processing performance in computing environments and subcomponents, again in which aspects of the present invention may be realized

Turning now to FIG. 4, an additional flow chart diagram of exemplary data management operations, in which aspects of the illustrated embodiments are incorporated, is depicted. Method 400 begins (step 402) with the organization of processing components (in this case, CPU groups) by physical hardware boundaries that are tied to certain tasks that have been organized into particular task pools, with the aim of increasing performance of each of the selected tasks within those task pools (step 404). Here again, the various CPU group(s) and the task pools are organized such that the hardware boundaries of the various CPUs coincide with/ have an affinity with certain tasks. The process of selecting certain CPUs by physical hardware boundary and associating with particular tasks affords the least amount of cross-chip communication, for example, and may significantly increase processing performance.

In a following step 406, the method 400 identifies various system resources for a use analysis function, such as data structures. In step 408, following, the method 400 queries whether the selected system resource exceeds a predetermined use threshold. If so, the system resource is classified as high-use resource in step 410, following. In other embodiments, the method 400 may also determine if a particular system resource is shared, or determine other aspects of the system resources known to one of ordinary skill such that those system resources are qualified as candidates for various classifications to follow.

Once various system resources have been analyzed, in the illustrated embodiment, heavily used resources, such as a shared, heavily used data structure, may be divided into one or more groups in order to significantly reduce synchronization mechanisms that would normally attach to these resources, such as locks (thereby reducing lock contention). These system resources groups may then be assigned to one or more particular task pools by, for example, affinity for a particular shared and/or heavy use model (step 412), and according to those characterizations, various task pool(s) may be assigned to the analyzed system resources, including an assignment to one or more CPU groups previously mentioned (step 414).

In a following step 416, method 400 queries whether any tasks are to be executed, and if so, the tasks in any particular pool(s) are executed, while the method 400 monitors for and records performance benchmarks (step 418). In step 420, the benchmarks that have been recorded are compared, and if the performance is improved (step 422), the CPU groups' physical boundary affiliation(s) with the particular task pool(s) is retained (step 424). Returning to step 422, if the performance is deemed not to have improved, the affiliation(s) of the physical boundaries with the task pool(s) is adjusted with the aim to increase performance (step 426).

Returning to step 416, if no remaining tasks are to be executed, the method 400 then ends (step 428).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for improving computing system performance by a processor device, comprising:
    organizing system resources including a plurality of Task Control Blocks (TCBs) into a plurality of groups, each of the plurality of groups assigned one of a plurality of predetermined task pools, each of the predetermined task pools having a plurality of tasks;
    wherein each of the plurality of groups corresponds to at least one physical boundary of the system resources such that a speed of an execution of the plurality of tasks for a particular one of the plurality of predetermined task pools is optimized by a placement of an association with the at least one physical boundary and the plurality of groups;
    organizing system resources exceeding a predetermined use threshold into multiple groups to reduce synchronization mechanisms comprising locks which normally attach to the system resources exceeding the predetermined use threshold, thereby reducing lock contention, wherein each of the multiple groups is assigned at least one of the predetermined task pools;
    organizing tasks in the computing system in each of the predetermined task pools according to an effectiveness of those tasks in a particular task pool to independently execute from those tasks in another particular task pool such that the tasks within each of the predetermined task pools are selected to be executed based on a known performance of those tasks in the particular task pool to independently execute from other tasks within the other particular task pool; and
    wherein organizing the system resources into the plurality of groups includes organizing a plurality of Central Processing Units (CPUs) into a plurality of CPU groups, each of the plurality of CPU groups assigned one of the plurality of predetermined task pools, wherein each of the plurality of CPU groups are selected in part based on the at least one physical boundary for optimizing the execution speed; organizing the plurality of TCBs into TCB task pools of the plurality of predetermined task pools; and assigning particular ones of the plurality of TCB task pools to particular ones of the plurality of CPU groups.

2. The method of claim 1, wherein the system resources include data structures, and further wherein if the data structures are determined to exceed the predetermined use threshold, the data structures are organized into multiple groups of data structures, each of the groups of data structures assigned at least one of the predetermined task pools.

3. A system for improving computing system performance comprising:

a processor device, operable in the computing system, that organizes system resources including a plurality of Task Control Blocks (TCBs) into a plurality of groups, each of the plurality of groups assigned one of a plurality of predetermined task pools, each of the predetermined task pools having a plurality of tasks;

wherein each of the plurality of groups corresponds to at least one physical boundary of the system resources such that a speed of an execution of the plurality of tasks for a particular one of the plurality of predetermined task pools is optimized by a placement of an association with the at least one physical boundary and the plurality of groups, organizes system resources exceeding a predetermined use threshold into multiple groups to reduce synchronization mechanisms comprising locks which normally attach to the system resources exceeding the predetermined use threshold, thereby reducing lock contention, wherein each of the multiple groups is assigned at least one of the predetermined task pools;

organizes tasks in the computing system in each of the predetermined task pools according to an effectiveness of those tasks in a particular task pool to independently execute from those tasks in another particular task pool such that the tasks within each of the predetermined task pools are selected to be executed based on a known performance of those tasks in the particular task pool to independently execute from other tasks within the other particular task pool; and wherein the processor device, pursuant to organizing the system resources into the plurality of groups includes organizes a plurality of Central Processing Units (CPUs) into a plurality of CPU groups, each of the plurality of CPU groups assigned one of the plurality of predetermined task pools, wherein each of the plurality of CPU groups are selected in part based on the at least one physical boundary for optimizing the execution speed, organizes the plurality of TCBs into TCB task pools of the plurality of predetermined task pools; and organizes particular ones of the plurality of TCB task pools to particular ones of the plurality of CPU groups.

4. The system of claim 3, wherein the system resources include data structures, and further wherein if the data structures are determined to exceed the predetermined use threshold, the data structures are organized into multiple groups of data structures, each of the groups of data structures assigned at least one of the predetermined task pools.

5. A computer program product for improving computing system performance by a processor device, the computer program product comprising a non-transitory computer-readable storage medium having computer-readable program code portions stored therein, the computer-readable program code portions comprising:

a first executable portion that organizes system resources including a plurality of Task Control Blocks (TCBs) into a plurality of groups, each of the plurality of groups assigned one of a plurality of predetermined task pools, each of the predetermined task pools having a plurality of tasks;

wherein each of the plurality of groups corresponds to at least one physical boundary of the system resources such that a speed of an execution of the plurality of tasks for a particular one of the plurality of predetermined task pools is optimized by a placement of an association with the at least one physical boundary and the plurality of groups;

organizes system resources exceeding a predetermined use threshold into multiple groups to reduce synchronization mechanisms comprising locks which normally attach to the system resources exceeding the predetermined use threshold, thereby reducing lock contention, wherein each of the multiple groups is assigned at least one of the predetermined task pools;

organizes tasks in the computing system in each of the predetermined task pools according to an effectiveness of those tasks in a particular task pool to independently execute from those tasks in another particular task pool such that the tasks within each of the predetermined task pools are selected to be executed based on a known performance of those tasks in the particular task pool to independently execute from other tasks within the other particular task pool; and a second executable portion that, pursuant to organizing the system resources into the plurality of groups, organizes a plurality of Central Processing Units (CPUs) into a plurality of CPU groups, each of the plurality of CPU groups assigned one of the plurality of predetermined task pools, wherein each of the plurality of CPU groups are selected in part based on the at least one physical boundary for optimizing the execution speed; a third executable portion that organizes the plurality of TCBs into TCB task pools of the plurality of predetermined task pools; and a fourth executable portion that organizes particular ones of the plurality of TCB task pools to particular ones of the plurality of CPU groups.

6. The computer program product of claim 5, wherein the system resources include data structures, and further wherein if the data structures are determined to exceed the predetermined use threshold, the data structures are organized into multiple groups of data structures, each of the groups of data structures assigned at least one of the predetermined task pools.

* * * * *